Dec. 8, 1959 R. MATHEZ 2,916,560

SOUND HEAD OF A MAGNETIC TAPE RECORDER

Filed July 17, 1956 2 Sheets-Sheet 1

INVENTOR
Robert Mathez
BY Edward Connors
ATTORNEY

Dec. 8, 1959 R. MATHEZ 2,916,560

SOUND HEAD OF A MAGNETIC TAPE RECORDER

Filed July 17, 1956 2 Sheets-Sheet 2

INVENTOR
Robert Mathez
BY Edward V. Connors
ATTORNEY

United States Patent Office 2,916,560

Patented Dec. 8, 1959

2,916,560

SOUND HEAD OF A MAGNETIC TAPE RECORDER

Robert Mathez, Lausanne, Switzerland

Application July 17, 1956, Serial No. 598,346

Claims priority, application Switzerland July 30, 1955

6 Claims. (Cl. 179—100.2)

This invention relates to a sound head of a magnetic tape recorder, for instance a sound recorder, having at least one magnetic core. In operation of the magnetic recorder a recording medium, for instance a magnetic tape or wire is carried over an air gap in the said magnetic core.

It is an object of this invention to find a sound head which is simple and cheap in manufacture, which is mechanically reliable and which has excellent electrical properties. The sound head according to this invention broadly comprises at least one magnetic core made of a number of core sheets, each of the said core sheets having at least two stamped fixing holes, pins being inserted into the said fixing holes and spacing tubes being pressed onto the said pins, the said core sheets being firmly clamped on the said pins between two spacing tubes pressed onto each pin, mounting plates having bores registering with the said pins, the said pins being inserted into the said bores for assembling two core halves.

Further objects and features of this invention will be apparent from the following specification and from the attached drawing which shows, by way of example, some embodiments of the sound head according to this invention.

Figure 1:
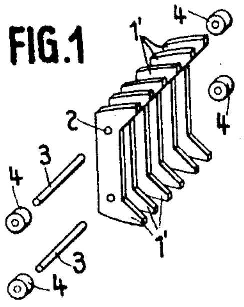
Fig. 1 is a perspective view of different parts constituting a core portion of a sound head.

Fig. 1 shows core sheets 1' made of an alloy of very high magnetic permeability, for instance of Permalloy or the like and having each two symmetrically arranged holes 2. Pins 3 of a non-magnetic alloy, for instance beryllium bronze or the like are provided adapted to be inserted into the holes 2 of the core sheets 1' without play for assembling the required number of sheets for forming a core portion 1. Small spacing tubes 4 are also provided adapted to be pressed on the said pins 3 without play, the spacing tubes 4 consisting also of a non-magnetic material such as brass or the like.

Figure 2:
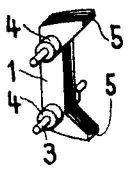
Fig. 2 is a perspective view of the assembled core portion.

Fig. 2 shows a core portion or core half assembled from the parts shown in Fig. 1, the pins 3 being inserted into the holes 2 of the core sheets and the spacing tubes 4 pressed onto the pins for laterally securing the core sheets. The faces 5 of the core are trued in a common plane and will contact a non-magnetic material interposed between two core halves in a manner later described.

Figure 3:
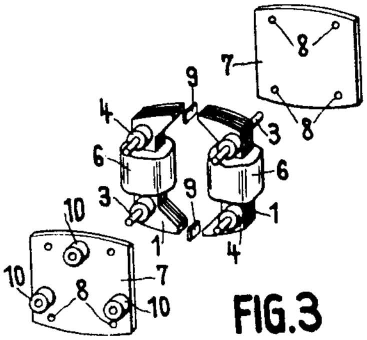
Figs. 3 and 6 are perspective views of two core portions provided with a winding before assembling the sound head.

Fig. 3 illustrates the way in which two core halves of the sound head, each provided with a winding 6 and having each trued plane faces 5 assembled by means of plates 7 of insulating material, the plates 7 having each four holes 8 having the same diameter as the pins 3. For assembling the sound head the ends of the pins 3 are inserted into the holes 8 of the plates 7 and leaves 9 having a thickness of 6 to 15$\mu$ of a non-magnetic material such as copper or bronze are inserted between faces 5, the leaves 9 constituting two symmetrical air gaps in the core of the sound head. The distance between holes 8 of the plates 7 is so designed that when the pins 3 are inserted in such holes in the manner described both core halves constituting the magnetic core of the sound head are firmly pressed against the leaves 9 so that such leaves are fixedly held between the core faces 5. Three sleeves 10 having a screw threaded bore are riveted to one of the plates 7 and will serve for fixing the sound head by means of three screws on a suitable supporting structure of the recorder and will also constitute the terminals for the sound head.

Figures 4, 5, 6:
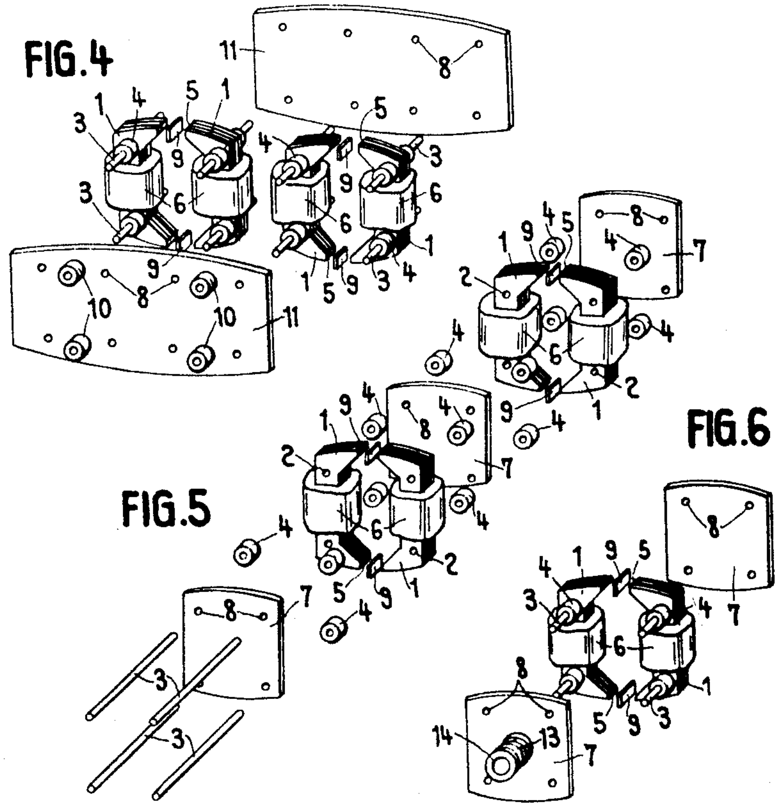
Figs. 4 and 5 are perspective views of the parts of sound heads having two magnetic cores.

Fig. 4 shows the parts of a sound head having two cores before assembling. The core halves are of the type described with reference to Figs. 1 to 3. The cores are spaced from each other but will cooperate with the same zone of the tape running over the sound head and are assembled by means of two plates 11 of insulating material having each two series of four holes 8. The series of holes 8 are spaced in such a way that in the assembled sound head the elements constituting the two magnetic cores will take the desired relation position and that the leaves 9 of non-magnetic material are firmly pressed between the faces 5 of each two core halves. The sleeves 10 shown in Fig. 4 are the same as those illustrated in Fig. 3 and serve the same purpose. The magnetic cores of this embodiment of the sound head may be of different width and may have air gaps of different width.

Fig. 5 illustrates another form of the sound head having two magnetic cores spaced transversely to the running direction of the magnetic tape, this sound head being adapted, for instance, for stereophonic recording on two adjacent paths of the magnetic recording tape. Each of the cores is constituted by the elements shown in Figs. 1 to 3. The parts of the sound head are assembled in the manner described with reference to Figs. 1 to 3 but there are three plates 7 of insulating material, and spacing tubes 4 are interposed between each core portion and each plate 7.

Figures 7, 8, 9, 10, 11, 12, 13:
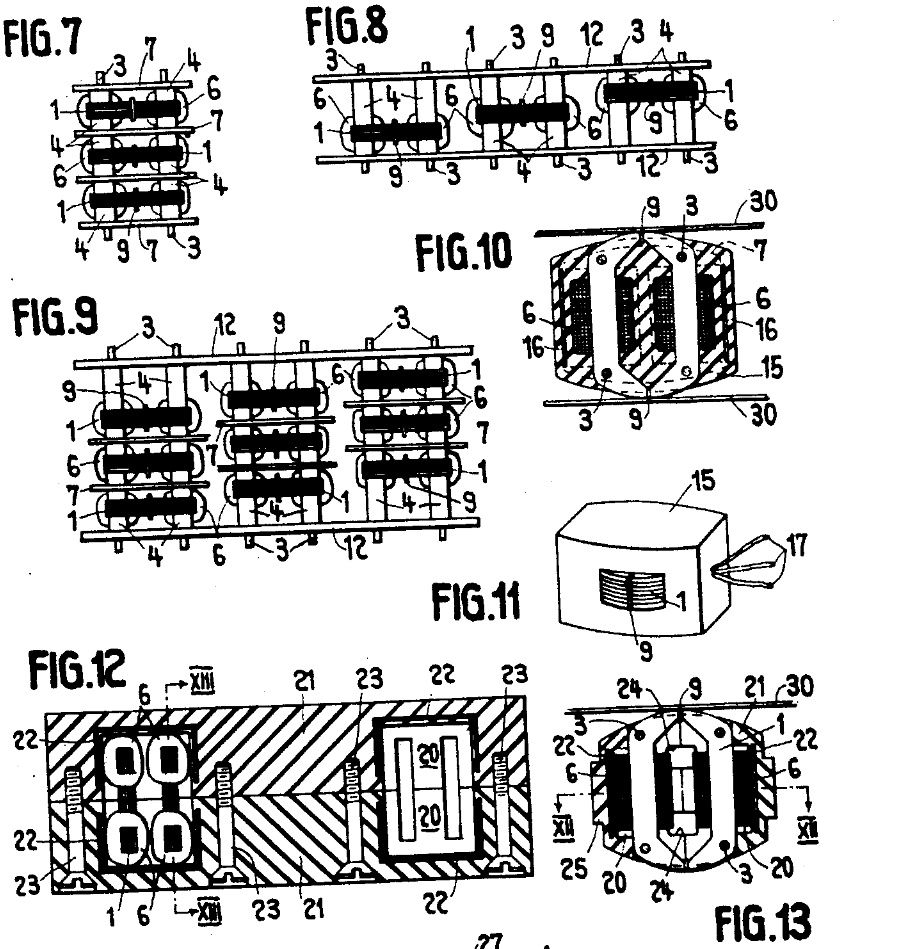
Figs. 7 and 8 are top views of two different sound head assemblies having three magnetic cores.
Fig. 9 is a top view of a sound head assembly having nine magnetic cores.
Figs. 10 and 11 show a completed sound head having a body of insulating material, in section and in a perspective view respectively
Figs. 12 to 14 illustrate another embodiment of the invention in a section along line XII—XII in Fig. 13, in section along line XIII—XIII in Fig. 12 and in a perspective view respectively.

Fig. 7 is a plan view of a sound head assembled of elements similar to those shown in Fig. 5, but having three cores laterally spaced from each other and having four mounting plates 7 of insulating material having fixing holes 8 as previously explained.

Fig. 8 is a top view of another assembled sound head having three magnetic cores, whereby the cores are spaced in the running direction of the recording tape and laterally to this direction, the lateral spacing between the heads being equal to the width of one magnetic core. This head allows recording on adjacent paths of the recording tape without losing space between adjacent recording paths. This head may serve for instance for simultaneously recording or reproducing three different programs with the same tape.

Fig. 9 is a top view of a sound head having nine magnetic cores in groups of three cores as illustrated in Fig. 7 and assembled in the manner shown in Fig. 8.

Since both air gaps formed between the core halves shall alternately be used the sound head should be mounted on a suitable carrier in a manner that it may easily be turned for bringing the one or other air gap into contact with the record tape. For this purpose the one mounting plate 7 of the sound head may be provided with a threaded fixing tube 13 as shown in Fig. 6 by means of which the sound head may be mounted in a screw-threaded bore of a support and may be fixed in the same by means of a counter nut. By loosening the counter nut the sound head may be turned into the position required for bringing the one or other air gap into contact with the recording tape. The connecting wires may be inserted through an axial bore 14 of the sleeve.

The sound head structure when assembled for instance in the manner shown in Figs. 7 to 9 may be immersed in a suitable mass of insulating material, for instance a plastic material such as the one known under the trade name "Markon," in a manner in which the magnetic core of the sound head will project from the body of the mass at two places, thereby exposing both air gaps for cooperation with a recording tape. Fig. 10 is a section view and Fig. 11 a perspective view of a completed sound head, for instance as described with reference to Figs. 1 to 3, but immersed in a body 15 of an insulating material. It is clearly seen from these illustrations that both air gaps of the magnetic core slightly project from the insulating body 15 so that a recording tape may slide over the air gaps without at the same time sliding on the body 15 or any other portions of the sound head. However, for use with sound recorders the recording tapes may also slide on the body 15 itself and therefore the magentic core may be imbedded into the isolating mass in such a way that the air gap portions of the core are flush with the surface of the body 15. U-shaped sheets 16 of high permeability magnetic material are laid round the sound head structure before immersing it in the body 15, such sheets 16 serving for screening the core 1 and the coils 6 against the influence of external magnetic and electric fields. If no terminals 10 are provided as shown in Fig. 3 connection wires 17 may be provided leaving the body 15 at a side having no air gap, as shown in Fig. 11. Screening sheets 16 of suitable size may be used with all the other embodiments of the sound head described in the foregoing and the structures of such sound heads may be immersed in a body of insulating material of suitable shape by any desired known process.

For high quality sound recording and reproduction by means of the sound heads described, it is of particular importance that the two core halves are absolutely symmetrical also with respect to the winding 6 wound thereon. In order to obtain absolutely symmetrical windings both core halves of one magnetic core are simultaneously wound on the same winding machine whereby both cores are fixed on the same shaft. By this means exactly the same number of turns is obtained for both windings 6 and therefore absolutely symmetrical electrical and magnetic properties are obtained for the magnetic core of the sound head this being of great importance for high quality operation and a favorable signal to noise ratio.

Figure 14:
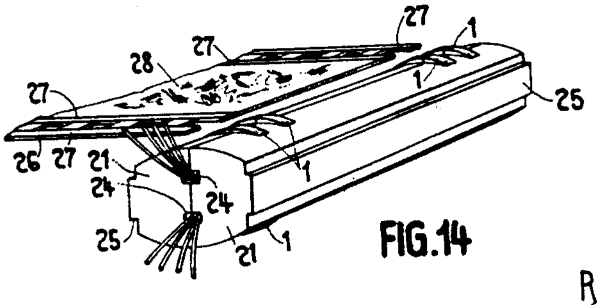

Figs. 12 to 14 show another embodiment of the sound head according to this invention wherein the magnetic cores are held in two symmetrical shells, whereby both core portions adjacent the air gaps of the cores are exposed at the shell surfaces for cooperation with a recording tape. The core portions of this sound head are not assembled by means of pins 3 and plates 7 but are tightly assembled by the pressure of the winding 6 wound onto the same and by means of a lacquer sticking the core sheets together. The so prepared core portions are assembled with the air-gap leaves 9 to magnetic cores and are inserted into recesses 20 moulded in the shells 21, wherein the cores are firmly held without play so that the core portions adjacent the air gaps will project from the shells 21. The shells 21 are produced by die moulding of a suitable insulating material, for instance a thermoplastic material or the above mentioned material known under the trade name "Markon" and screen sheets 22 for the cores 1 and windings 6 are directly moulded into the shells. The shells 21 are assembled by means of screws 23 and may subsequently be dipped in a liquid or plastic material which will subsequently harden and hermetically seal the sound head. Canals 24 are provided in each shell 21 for taking up the connection wires of the sound head. A rib 25 is formed on each shell serving for inserting the sound head into suitable slots on a supporting structure for the sound head. Since the shells 21 are absolutely symmetrical the sound head may be inserted in the one or other direction into its supporting structure (not shown) whereby the one or other air gap portions of the four cores provided in the sound head illustrated will cooperate with a cinematographic film 26 indicated in Fig. 14. Thereby the strips 27 of a magnetic layer of the film will slide over the air gaps of cores 1 while the remaining portions of the film, particularly the film pictures 28, will not slide on any portion of the sound head. When the one air gap portion is worn off the sound head is turned so that the other air-gap portions will contact the film passing over the sound head. Thereby the cores may be worn off in two places instead of in one place so that the lifetime of the sound head is doubled.

A simple sound head for instance the one shown in Figs. 10 and 11 of the drawing may also be used for simultaneously recording the same program on two magnetic tapes, an application that may be of particular interest in the production of records for sale. This application is indicated in Fig. 10, where two magnetic tapes 30 are simultaneously passed over one single core at both air gap portions thereof.

Instead of terminals 10 or connection wires, laterally projecting plugs may be provided on the sound head, adapted to be inserted into a suitable socket so as to expose the one or other air-gap portion of the magnetic core or cores of the sound head to the magnetic recording tape.

While the invention has been described and illustrated with reference to specific embodiments thereof, it will be understood that other embodiments may be resorted to without departing from the invention. Therefore the forms of the invention set out above should be considered as illustrative and not as limiting the scope of the following claims.

What I claim is:

1. A sound head of the type described, comprising at least one magnetic core made of a number of core sheets, each of the said core sheets having at least two stamped fixing holes, pins being inserted into the said fixing holes and spacing tubes being pressed onto the said pins, the said core sheets being firmly clamped on the said pins between two spacing tubes pressed onto each pin, mounting plates having bores registering with the said pins, the said pins being inserted into the said bores for assembling two core halves.

2. A sound head according to claim 1, each core sheet having two fixing holes and two pins being inserted into each core half, a mounting plate having four holes being arranged on each side of the core halves, whereby the pins are inserted into the holes of the mounting plates thereby assembling the halves of the core.

3. A sound head of the type described, comprising at least one core of magnetizable material, each of the said cores being made of a number of superposed core sheets having each at least two fixing holes, mounting pins inserted into covering fixing holes of superposed sheets of each core, opposite ends on each pin projecting laterally from the said core, spacing and fixing tubes press-fitted onto the said projecting ends of the said mounting pins, inner faces on the said fixing tubes laterally engaging the outer sheets of the said core thereby compressing the core sheets between fixing tubes pressed onto opposite ends of the said mounting pins, outer faces on the said fixing tubes and mounting plates having mounting holes receiving the ends of the said mounting pins and engaging the said outer faces of the spacing and fixing tubes.

4. A sound head of the type described, comprising at least one core of magnetizable material, each core comprising two core portions made of a number of stacked core sheets having each at least two fixing holes, mounting pins inserted into covering fixing holes of stacked sheets of each core portion, opposite ends on each pin projecting laterally from the said core portion, spacing and fixing tubes press-fitted onto the said projecting ends of the said mounting pins, inner faces no the said fixing tubes laterally engaging the outer sheets of the said core portion thereby compressing the core sheets between fixing tubes pressed onto opposite ends of the said mounting pins, each core portion comprising the said number of core sheets the said mounting pins and the said spacing and fixing tubes forming a self-supporting rigid unit, a winding on each of the said core portions, outer faces on the said fixing tubes and mounting plates having mounting holes receiving the ends of the said mounting pins and engaging the said outer faces of the spacing and fixing tubes, at least two core portions being assembled to form a complete core of the sound head by means of the said mounting plates.

5. A sound head according to claim 4, at least two complete cores being provided between two common mounting plates, the cores being held in different planes parallel to the planes of the mounting plates by fixing and spacing tubes of different lengths inserted between the cores and the mounting plates.

6. A sound head according to claim 4, wherein at least two complete cores are provided on common mounting pins, mounting plates and fixing and spacing tubes being provided on either side of each core so assembled on common mounting pins.

References Cited in the file of this patent

UNITED STATES PATENTS

| | | |
|---|---|---|
| 2,561,365 | Hare | July 24, 1951 |
| 2,592,652 | Buhrendorf | Apr. 15, 1952 |
| 2,708,694 | Begun et al. | May 17, 1955 |
| 2,745,905 | Bobb | May 15, 1956 |
| 2,751,440 | DeTurk et al. | June 19, 1956 |
| 2,769,036 | Selsted | Oct. 30, 1956 |